United States Patent [19]

Loucks, Jr.

[11] Patent Number: 5,236,292
[45] Date of Patent: Aug. 17, 1993

[54] Y-AXIS FIXTURE FOR A MACHINE TOOL WORKTABLE

[76] Inventor: Donald S. Loucks, Jr., 30 Edgewater Park, Toledo, Ohio 43611

[21] Appl. No.: 721,241

[22] Filed: Jun. 26, 1991

[51] Int. Cl.⁵ ............................................. B23Q 3/02
[52] U.S. Cl. ................................... 409/218; 269/99
[58] Field of Search .............. 409/225, 218, 220, 344, 409/900.1, 903; 408/88, 89, 95; 269/99, 100, 301, 303, 315, 318, 319, 900, 20, 309, 310; 83/468.2, 468.7; 51/240 R

[56] References Cited

U.S. PATENT DOCUMENTS

| | | | |
|---|---|---|---|
| 1,329,728 | 2/1920 | Sovereign | 269/100 |
| 2,333,986 | 11/1943 | Crayton . | |
| 2,349,087 | 5/1944 | Fraser . | |
| 2,620,704 | 12/1952 | Evans | 269/99 X |
| 2,676,413 | 4/1954 | Wharton et al. | 408/89 |
| 2,782,661 | 2/1957 | Lewis | 269/55 |
| 3,554,530 | 1/1971 | Moore | 269/301 |
| 3,830,485 | 8/1974 | Mickelsson et al. | 269/25 |
| 4,072,439 | 2/1978 | Diggs | 408/90 |
| 4,073,215 | 2/1978 | Coope et al. | 269/900 X |
| 4,186,916 | 2/1980 | Varga | 269/303 |
| 4,465,268 | 8/1984 | Hudson | 269/99 |
| 4,645,391 | 2/1987 | Fallert | 409/225 |
| 4,794,687 | 1/1989 | Peters et al. | 409/225 X |
| 4,861,011 | 8/1989 | Varga | 269/99 |
| 4,880,221 | 11/1989 | Richards | 269/99 X |
| 4,964,450 | 10/1990 | Hughes et al. | 269/318 X |

Primary Examiner—Z. R. Bilinsky
Attorney, Agent, or Firm—William J. Clemens

[57] ABSTRACT

An apparatus for precisely locating a workpiece along a Y-axis of a milling machine worktable includes a fixture body having a generally rectangular cross section and at least one generally planar reference surface. The body has three longitudinally spaced apart apertures formed therethrough for retaining bolts. A nut threadably engages the center bolt and cooperates with an inverted T-shaped slot formed in the workpiece supporting surface of the worktable to clamp the body to the table. The body has a pair of spaced apart channels formed therein each with a longitudinal axis generally perpendicular to a longitudinal axis of the body, the channels being located at associated ones of the other two apertures. A foot having a pedestal portion is located in each channel for engaging a corresponding slot formed in the worktable. The feet are formed with a width corresponding to a width of an opening of the slot in which they are located.

9 Claims, 1 Drawing Sheet

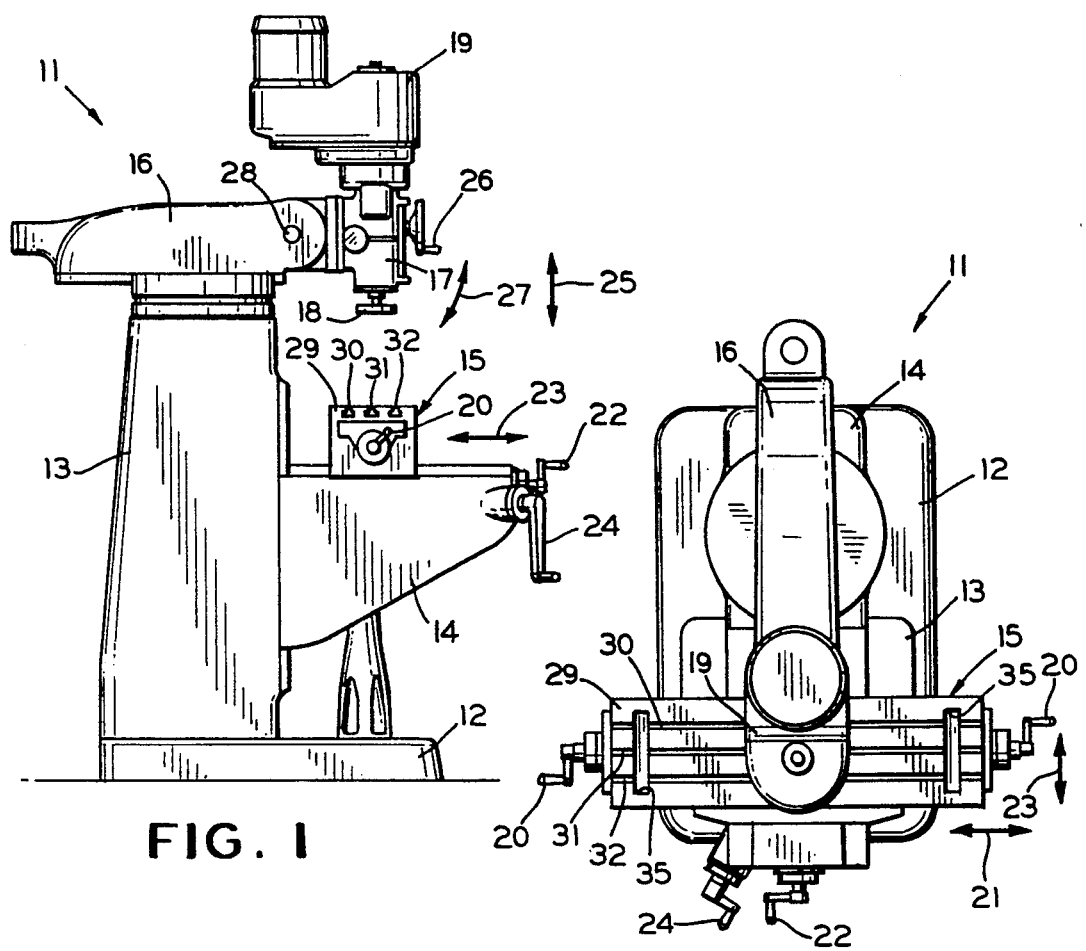
FIG. 1
FIG. 2
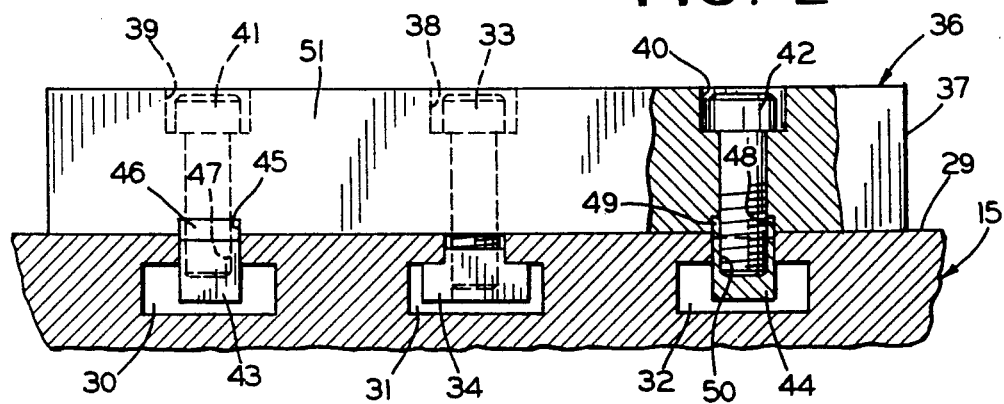
FIG. 3
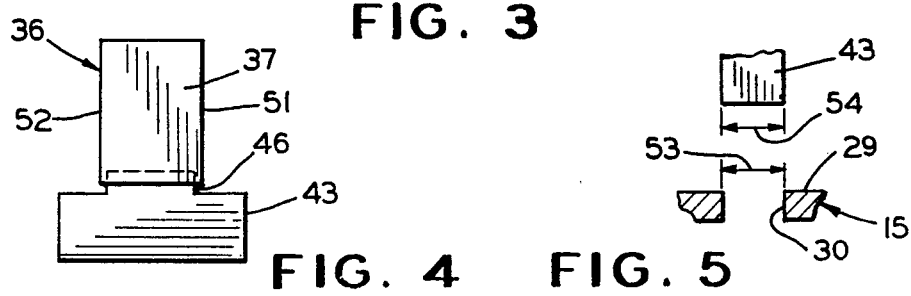
FIG. 4   FIG. 5

Y-AXIS FIXTURE FOR A MACHINE TOOL WORKTABLE

BACKGROUND OF THE INVENTION

The present invention relates generally to an apparatus for referencing a workpiece to a worktable and, in particular, to an apparatus for providing a Y-axis reference for a vertical milling machine.

A milling machine is a machine tool that removes metal as the work is fed against a rotating cutter. Except for rotation, the circular-shaped cutter has no other motion. It is called a milling cutter and has a series of cutting edges on its circumference, each of which acts as an individual cutter in the cycle of rotation. The work is held on a table which controls the feed against the cutter. In most milling machines, there are three possible table movements, longitudinal, cross-wise and vertical, but in some machines, the table can also swivel or rotate.

The milling machine is the most versatile of all machine tools. Flat or formed surfaces can be machined with excellent finish and great accuracy. Angles, slots, gear teeth and recess cuts can be made by using various cutters. Drills, reamers, and boring tools can be held in the arbor socket by removing the cutter and arbor. Since all table movements have micrometer adjustments, holes and other cuts can be accurately spaced. Most operations performed on shapers, drill presses, gear-cutting machines, and broaching machines can likewise be done on the milling machine. It produces a better finish and holds to accurate limits with greater ease than a shaper. Heavy cuts can be taken with no appreciable sacrifice in finish or accuracy. Cutters are efficient in their action and can be used a long time before being resharpened. In most cases, the work is completed in one pass of the table. These advantages, plus the availability of a wide variety of cutters, make the milling machine indispensable in the machine shop and tool room.

A typical vertical milling machine is so called because of the vertical position of the cutter spindle. The table movements are the same as in plane machines. Ordinarily, no movement is given to the cutter other than the usual rotational motion. However, the spindle head can be swiveled, which permits setting the spindle in a vertical plane at any angle from vertical to horizontal. This machine is also provided with a short axle spindle travel to facilitate step milling. Some vertical milling machines are provided with rotary attachments or rotating worktables to permit the milling of circular grooves or continuous milling of small production parts. Cutters are all of the end-mill type.

Uses of the machine include drilling, boring, and reaming, accurate spacing of holes because of the micrometer adjustment of the table, facing cuts, and finishing in recesses. Profiling and die-sinking machines are very similar to vertical milling machines in their operation.

In order to accurately position the workpiece on the worktable with respect to the cutter, the table is often provided with one or more generally T-shaped slots for engaging various stops and clamps. However, the tolerances on the slot opening and the tolerances on stops or clamps which engage the slots many times make it impossible to position the workpiece with the accuracy required to form a finished part.

SUMMARY OF THE INVENTION

The present invention concerns an apparatus for precisely locating a workpiece on a supporting surface of a milling machine worktable. The apparatus has a longitudinally extending fixture body with a generally rectangular cross section and at least one generally planar reference surface, typically a pair of opposed generally vertical surfaces. The body also has three longitudinally spaced apart apertures formed therethrough.

The worktable can have three or more inverted T-shaped slots formed in the workpiece supporting surface extending generally parallel to an X-axis. Clamping means is provided on the body for attaching the body to the supporting surface and includes a center one of the apertures, a bolt extending through the center aperture and retained in the body, and a nut threadably engaged with the bolt and cooperating with the center slot.

Positioning means is attached to the body for locating the reference surfaces generally parallel to a Y-axis of the worktable. The body has a pair of spaced apart channels formed therein each with a longitudinal axis generally perpendicular to a longitudinal axis of the body. The channels are located at associated ones of the other two of the apertures and the positioning means includes a foot having a pedestal portion located in each of the channels for engaging a corresponding one of the other two slots formed in the worktable. The feet are each formed with a width corresponding to a width of an opening of the associated slot.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a side elevation view of a typical vertical milling machine on which a Y-axis parallel apparatus in accordance with the present invention is used;

FIG. 2 is a top plan view of the milling machine shown in the FIG. 1;

FIG. 3 is a fragmentary front elevation view of the Y-axis parallel apparatus in accordance with the present invention mounted on a worktable;

FIG. 4 is an end elevation view of the apparatus shown in the FIG. 3; and

FIG. 5 is an exploded fragmentary view of a portion of the Y-axis parallel apparatus and worktable shown in the FIG. 3.

DESCRIPTION OF THE PREFERRED EMBODIMENT

There is shown FIGS. 1 and 2 a typical vertical milling machine in the form of a Bridgeport Series I Turret Miller Model BR2J. The milling machine 11 includes a ground engaging base 12 attached to a lower end of a vertically extending column 13. A knee 14 is attached to an extends horizontally from the column 13 at about the midpoint of the column. A worktable 15 is mounted on an upper surface of the knee 14. A generally horizontally extending overarm 16 is attached to an upper end of the column 13 and has a longitudinal axis which extends generally parallel to a longitudinal axis of the knee such that an outer end of the overarm 16 is positioned above the worktable 15.

Attached to the outer end of the overarm 16 is a spindle 17 for mounting a cutter 18. The cutter 18 is positioned at the bottom of the spindle 17 and a drive means 19 is attached to the top of the spindle 17 for rotating the cutter 18. Manual controls are provided for adjusting the relationship of a Workpiece mounted on the worktable 15 and the cutter 18. For example, a pair of cranks 20, one at each end of the worktable 15, is provided for adjusting the worktable 15 along a longitudinal or X-axis as illustrated by a double headed arrow 21 in the FIG. 2. A crank 22 is mounted at a front end of the knee 14 and provides an adjustment of the worktable 15 along a transverse or Y-axis as indicated by a double headed arrow 23 in the FIGS. 1 and 2. A crank 24 is provided at a front end of the knee 14 to adjust the knee 14 and the worktable 15 along a vertical or Z-axis as indicated by a double headed arrow 25 in the FIG. 1. In addition, a crank 26 is provided on a front surface of the spindle 17 for adjusting the position of the cutter 18 along a curved path represented by a double headed arrow 27 representing rotational movement of the spindle 17 about a pivot point 28 on the overarm 16.

Referring now to the FIGS. 1 through 3, the worktable 15 includes means for securing a workpiece or a fixture to an upper, generally horizontally extending support surface 29 of the worktable 15. Such means can include one or more slots, such as a plurality of slots 30, 31 and 32 formed in the surface 29. The slots 30 through 32 extend along the longitudinal axis of the worktable 15 in a direction parallel to the X-axis 21. The slots 30 through 32 are formed in the shape of an inverted letter "T" as best shown in the FIG. 3.

Various conventional clamps and fixtures can be supported on the surface 29 and retained in position through any conventional means which cooperates with one or more of the slots 30, 31 and 32. For example, a bolt 33 can extend through an aperture formed in the fixture or clamp and threadably engage a nut 34 located in the wider bottom portion of the slot 31. The bolt 33 is threaded into the nut 34 to securely clamp the fixture or clamping fixture to the worktable 15. When the bolt 33 and the nut 34 are loosened, the fixture can easily be moved on the surface 29 to a new location. Such clamping means is suitable for many types of milling work. However, where precise measurements have to be maintained on the workpiece, the location of the fixture on the surface 29 is only as accurate as the measuring devices utilized to locate the fixture before it is clamped to the worktable 15. Such an operation is time consuming since measurements from reference points to at least two points on the fixture must be made and many times repeated to assure proper location of the fixture. As shown in the FIG. 2, a pair of openings 35 are provided in the surface 29 adjacent opposite ends of the worktable 15 to permit the insertion of the nuts 34 into the bottoms of the slots 30 through 32.

The present invention is an apparatus for providing a workpiece reference surface which is parallel to the Y-axis of the milling machine. As shown in the FIGS. 3 and 4, a Y-axis parallel fixture 36 includes a body 37 of generally rectangular cross-section and a sufficient length to extend across the slots 30, 31 and 32. Formed at approximately the midpoint of the body 37 is a vertically extending aperture 38 extending through the body 37 and having an upper counterbored end for retaining the head of the bolt 33. Formed on opposite sides of the aperture 38 are a pair of similar apertures 39 and 40. The upper ends of the apertures 39 and 40 are also counterbored for retaining enlarged heads of a pair of bolts 41 and 42 respectfully.

The Y-axis parallel fixture 36 also includes a pair of feet 43 and 44 attached to the body 37 by the bolts 41 and 42 respectively. At the bottom of the aperture 39, the body 37 has a slot or channel 45 formed therein which extends in a longitudinal direction generally parallel to a longitudinal axis of the associated slot 30. The foot 43 has an upwardly extending pedestal 46 formed thereon which cooperates with the slot 45 to maintain a longitudinal axis of the foot 43 generally perpendicular to a longitudinal axis of the body 37. A threaded aperture 47 is formed through the pedestal 46 and into an upper portion of the foot 43 for threadably engaging a lower end of the bold 41. Thus, the bolt 41 securely retains the foot 43 in the slot 45. Similarly, a slot 48 is formed parallel to the slot 45 and receives a pedestal 49 formed on an upper surface of the foot 44. A threaded aperture 50 is formed through the pedestal 49 and into an upper portion of the foot 44 to threadably retain a lower end of the bolt 42.

In operation, the Y-axis parallel fixture 36 is placed on the surface 29 of the worktable 15 by inserting the nut 34 and the feet 43 and 44 into one of the openings 35. The Y-axis parallel fixture 36 is then moved along the surface 29 in the direction of the arrow 21 to a desired X-axis location. Either or both of a pair of opposed vertical surfaces 51 or 52 formed on the body 37 can be utilized as a reference surface for locating a workpiece. The surfaces 51 and 52 are formed at right angles to the longitudinal axes of the feet 43 and 44. If the body 37 is formed with a one inch width, one of the surfaces can be used as the X-axis stop and the other surface will be precisely one inch away. Furthermore, the upper surface of the body 37 will be a predetermined distance from the table surface 29, such as one and one half inches to provide another reference point.

The longitudinal axes of the feet 43 and 44 are maintained parallel to the X-axis of the worktable 15 in the following manner. As shown in the FIG. 5, the slot 30 is formed with a width 53 at the surface 29. As is typical of most machine tool manufacturers, Bridgeport forms the slots in its worktables with a predetermined dimension having a predetermined tolerance range. If the foot 43 is formed with a width 54 which precisely matches the width 53, then the vertical surfaces 51 and 52 automatically will be parallel to the Y-axis 23 of the worktable 15 when the Y-axis parallel fixture 36 is installed on the worktable. For even greater accuracy, the foot 43 can be machined based upon an actual measurement of the slot width 53 of the slot 30 of a particular milling machine 11. For example, the width 54, for cooperation with the slots 30 through 32 of the milling machine 11 shown in the FIGS. 1 and 2, will be 0.624" with a tolerance −0.001" and +0.000".

Although the Y-axis parallel fixture 36 has been illustrated and discussed as having planar vertical surfaces 51 and 52, any suitable means for locating and/or clamping a workpiece can be provided. Thus, for example, threaded apertures can be formed in any of the external surfaces of the body 37 for mounting various types of conventional fixtures and clamps.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for locating a workpiece on a supporting surface of a worktable of a milling machine, the supporting surface having an X-axis and a Y-axis and at least three slots formed therein extending along the X-axis, comprising:
   a fixture body having a generally rectangular cross section, a longitudinal axis and at one generally planar vertical reference surface;
   clamping means attached said body for releasably attaching said body to a workpiece supporting surface of a worktable, said clamping means releasably engaging a first slot formed in the workpiece supporting surface, the first slot extending along an X-axis of the workpiece supporting surface; and
   positioning means attached to said body for engaging a second slot and a third slot formed in the workpiece supporting surface, the second and third slots extending along the X-axis of the workpiece supporting surface, said positioning means permitting said body to be moved along the X-axis of the workpiece supporting surface and locating said reference surface parallel to a Y-axis of the workpiece supporting surface at any selected position along the X-axis of the workpiece supporting surface and wherein said body has a channel formed therein with a longitudinal axis generally perpendicular to said longitudinal axis of said body and said positioning means includes a foot located in said channel for engaging one of the second and third slots.

2. The apparatus according to claim 1 wherein said clamping means includes an aperture formed through said body, a bolt extending through said aperture and retained in said body, and a nut threadably engaged with said bolt, said nut cooperating with an inverted T-shaped slot formed as the first slot in the workpiece supporting surface of the worktable.

3. The apparatus according to claim 1 wherein said foot has a pedestal formed thereon extending into said channel.

4. The apparatus according to claim 1 wherein said positioning means includes an aperture formed through said body, a bolt extending through said aperture and retained in said body and a threaded aperture formed in said foot for threadably engaging said bolt.

5. The apparatus according to claim 1 wherein said foot is formed with a width corresponding to a width of an opening of the one slot in the workpiece supporting surface.

6. An apparatus for locating a workpiece on a supporting surface of a worktable of a milling machine, the support surface having an X-axis and a Y-axis and at least three slots formed therein extending along the X-axis, comprising:
   a fixture body having a generally rectangular cross section, a longitudinal axis and at least one generally planar vertical reference surface, said body having three apertures formed therethrough;
   clamping means attached to said body for releasably attaching said body to a workpiece supporting surface of a worktable, said clamping means including one of said apertures, a bolt extending through said one aperture and retained in said body, and a nut threadably engaged with said bolt, said nut cooperating with an inverted T-shaped slot formed in the workpiece supporting surface of the worktable, the slot extending along an X-axis of the workpiece supporting surface; and
   positioning means attached to said body for selectively locating said reference surface parallel to a Y-axis of the worktable workpiece supporting surface, said body having a pair of spaced apart channels formed therein each with a longitudinal axis generally perpendicular to said longitudinal axis of said body, said channels being located at associated ones of the other two of said apertures and said positioning means including a foot located in each said channel for engaging a corresponding slot formed in the worktable to permit movement of said body along the X-axis of the workpiece supporting surface.

7. The apparatus according to claim 6 wherein each said foot has a pedestal formed thereon extending into said channel.

8. An apparatus for locating a workpiece on a supporting surface of a worktable of a milling machine, the support surface having an X-axis and a Y-axis and at least three slots formed therein extending along the X-axis, comprising:
   a fixture body having a generally rectangular cross section, a longitudinal axis and at least one generally planar vertical reference surface, said body having three longitudinally spaced apart apertures formed therethrough;
   clamping means attached to said body for releasably attaching said body to a workpiece supporting surface of a worktable, said clamping means including a center one of said apertures, a bolt extending through said center aperture and retained in said body, and a nut threadably engaged with said bolt, said nut cooperating with an inverted T-shaped slot formed in the workpiece supporting surface of the worktable, the slot extending along an X-axis of the workpiece supporting surface; and
   positioning means attached to said body for selectively locating said reference surface parallel to a Y-axis of the worktable workpiece supporting surface, said body having a pair of spaced apart channels formed therein each with a longitudinal axis generally perpendicular to said longitudinal axis of said body, said channels being located at associated ones of the other two of said apertures and said positioning means including a pair of feet, each said foot having a pedestal portion located in one of said channels for engaging a corresponding one of two other slots formed in the worktable along the X-axis of the workpiece supporting surface for permitting movement of said body along the X-axis of the workpiece supporting surface.

9. The apparatus according to claim 8 wherein said foot is formed with a width corresponding to a width of an opening of the slot in the workpiece supporting surface.

* * * * *